United States Patent
Golberg et al.

(10) Patent No.: US 7,403,336 B2
(45) Date of Patent: Jul. 22, 2008

(54) BROADBAND IMAGING SYSTEM AND METHOD

(75) Inventors: Boris Golberg, Ashdod (IL); Benjamin Cohen, Jerusalem (IL)

(73) Assignee: Applied Materials, Israel, Ltd., Rehovot (IL)

(*) Notice: Subject to any disclaimer, the term of this patent is extended or adjusted under 35 U.S.C. 154(b) by 0 days.

(21) Appl. No.: 11/554,468

(22) Filed: Oct. 30, 2006

(65) Prior Publication Data

US 2008/0100917 A1    May 1, 2008

(51) Int. Cl.
*G02B 27/10* (2006.01)
*G03B 27/42* (2006.01)
(52) U.S. Cl. .................. 359/618; 355/53
(58) Field of Classification Search ............ 359/618
See application file for complete search history.

(56) References Cited

U.S. PATENT DOCUMENTS

| 6,882,331 B2 * | 4/2005 | Wu ..................... 345/82 |
| 2003/0164996 A1 * | 9/2003 | Popovich et al. ........ 359/22 |

* cited by examiner

*Primary Examiner*—Jordan M. Schwartz
*Assistant Examiner*—James C Jones
(74) *Attorney, Agent, or Firm*—Tarek N. Fahmi

(57) ABSTRACT

A method and system are presented for use in imaging broadband light. A plurality of substantially narrowband light components of the broadband light are passed through an array of spectral imaging modules. Each of the spectral imaging modules is configured for imaging light of a respective substantially narrow spectral band with minimal aberrations. This technique provides for producing an image with minimal aberrations over the entire spectral range of the broadband light.

9 Claims, 4 Drawing Sheets

Fig. 1
*Single Lens*
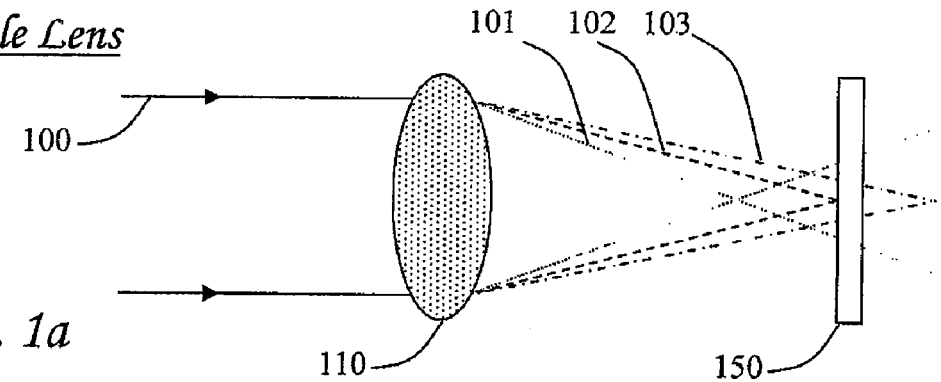
Fig. 1a
*Achromatic Lens*
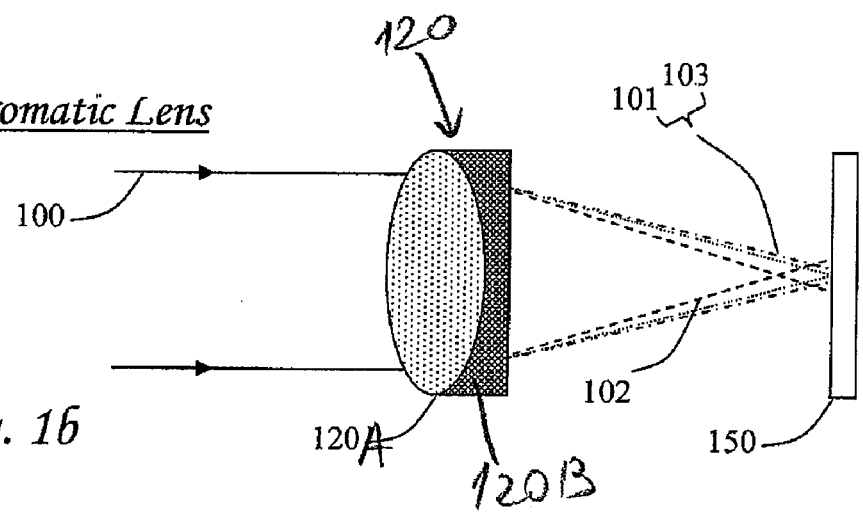
Fig. 1b
*Apochromatic Lens*
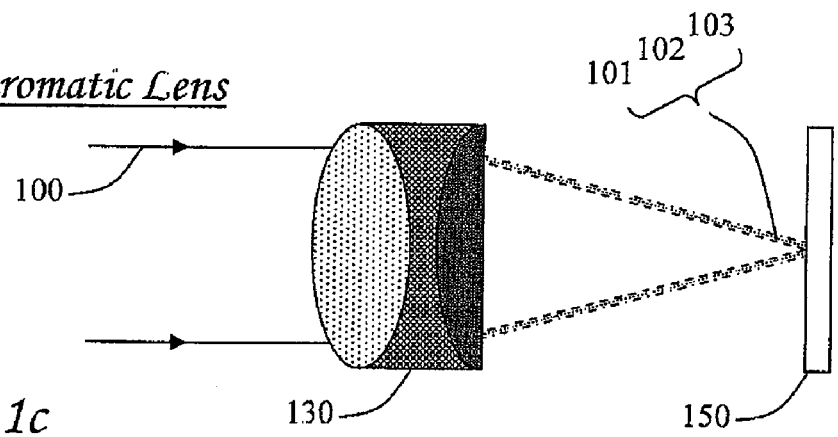
Fig. 1c

BROADBAND IMAGING SYSTEM AND METHOD

FIELD OF THE INVENTION

This invention is generally in the field of imaging techniques, and relates to a broadband imaging method and system.

BACKGROUND OF THE INVENTION

Imaging systems are generally of two types, using reflective and refractive or catadioptric optics. Reflective imaging systems have no chromatic aberration, and their operating spectral bandwidth is limited by the reflectance of the surfaces of said optics. These systems, however, are not appropriate for all imaging tasks. Refractive or catadioptric systems, on the other hand, are limited by the spectral characteristics of optical materials used. This includes their transparency range, and also the variation in their dispersion properties, which affects chromatic aberration correction.

The problem of chromatic aberration is well known in the field of optical imaging. Any refractive element placed in the path of a polychromatic light, gives rise to chromatic aberrations as a result of the wavelength dependence of the dispersive properties of the material making up the refractive element. For example, calcium fluoride is transparent from the ultraviolet to the thermal infrared. However, in the ultraviolet it is a relatively low-dispersion material, in the visible range it is a very low-dispersion material, and in the 3-5 μm range it is a very high-dispersion material. Zinc selenide is transparent from the mid-visible range to the thermal infrared. In the long-wave visible range it is a very high-dispersion material, in the 3-5 μm range it is a low-dispersion material, and in the 8-12 μm range it is again a high-dispersion material. The design of a refractive broadband spectral system is thus limited by the availability of optical material combinations which correct chromatic aberrations over the spectral range.

Chromatic aberration is typically caused by an imaging lens not focusing different wavelengths of light onto the exact same focal plane (the focal length for different wavelengths is different) and/or by the lens magnifying different wavelengths differently. These types of chromatic aberration are known as "Longitudinal Chromatic Aberration" and "Lateral Chromatic Aberration" respectively and can occur concurrently. The amount of chromatic aberration depends on the dispersion of the glass. Thus for example a refractive lens will focus light of different wavelengths at different focal planes. In the case of a convex convergent lens, the shorter the wavelength of the light the closer its focal plane is to the lens. Chromatic aberration is visible as color fringing around contrasty edges and occurs more frequently around the edges of the image frame in wide angle shots.

FIG. 1A illustrates the chromatic aberration effects upon a polychromatic light flux 100 caused by a simple lens 110. The passage of three light components 101, 102 and 103 of three different wavelengths, respectively, is shown. Short wavelength blue light component 101 is dispersed most strongly by lens 110 and has a shorter focal length than green light component 102 which is focused upon a detector 150. Longer wavelength red light component 103 has a longer focal length. Thus, an image formed upon detector 150 placed in the focal plane of the green light will produce an image with chromatic fringing.

Various methods are known for correcting this effect. The most common method used is to employ an achromatic lens. An achromatic lens is a couplet of two lenses made from different materials such as crown glass and flint glass which have different dispersive properties. It is possible to combine a converging lens of one material with a diverging lens of a second material such that any two wavelengths are brought to focus upon the same focal plane.

FIG. 1B shows the operational principles of an achromatic lens 120 which is configured as a couplet of two lens elements 120A and 120B made from different materials such as crown glass and flint glass. Here the correction has lengthened the focal length for a blue light component 101 and shortened the focal length for a red light component 103 so that they share the same focal length. A green light component 102 is focused in front of a detector 150, resulting in reduced but not eliminated chromatic fringing.

Over the visible light range, the best correction is considered to be obtained where the condition, $V_1 f_1 + V_2 f_2 = 0$, is satisfied, where $V_1$ and $V_2$ are the Abbe numbers of the first and second lens respectively, and $f_1$ and $f_2$ are the focal lengths of light at wavelength 589.2 nm for the first and second lenses. This condition ensures that blue light of wavelength 486.1 nm and red light of wavelength 656.3 nm will share the same focal length. Other wavelengths of light will have similar but not identical focal lengths thus reducing the effect of chromatic aberration but not removing it all together.

Chromatic correction can be further improved by the use of an agent such as fluorspar which can be introduced forming aprochromatic lens triplets. Such combinations can be adapted such that three or four separate wavelengths can be brought into focus at the same focal lengths.

FIG. 1C illustrates the operation principles of an apochromatic lens 130 to correct for all three wavelengths of light, such that the paths of blue 101, green 102, and red 103, light components are coincident. It should, however, be noted that intermediate wavelengths (not shown here) will not focus upon exactly the same focal plane, thus the image will still display a certain degree of fringing.

One further method of chromatic correction is the use of holographic or diffraction lenses. Diffraction lenses typically deflect longer wavelengths further than shorter wavelengths of light, which is the opposite effect to that of refractive lenses. Thus, by etching a converging diffraction lens directly onto the surface of a converging refractive lens, it is possible to compensate for chromatic aberrations in a fashion similar to that described above.

The methods described above all correct for chromatic aberration over relatively narrow bandwidth, that is to say the range of wavelengths for which chromatic aberrations are corrected is limited. Current broadband imaging systems often employ reflective elements, which are intrinsically achromatic. These systems however are not appropriate when a large relative aperture or field of view is required.

SUMMARY OF THE INVENTION

These is a need in the art for refractive or catadioptric optical imaging systems operating in a very wide spectral range with eliminated or at least significantly reduced chromatic aberrations effects over an unlimited range of wavelengths.

The term "imaging system" used herein refers to any of image acquisition, focusing, projecting, monitoring, measuring, and inspection system.

The present invention provides a novel imaging system and method, utilizing a plurality of spectrally different imaging modules operating together for imaging input broadband light. Each of these imaging modules is configured for operating with its own limited spectral range with practically no (or minimal) chromatic aberrations. The imaging module includes one or more focusing/imaging lenses, which may be specifically configured for correcting chromatic aberrations. Such a system including multiple spectrally different imaging modules each with practically no chromatic aberration effects provides for imaging input broadband light with no or significantly reduced chromatic aberrations over a large range of wavelengths. This enables to provides total correction for chromatic aberration or significantly reduce the chromatic aberration in the system output. The latter may be in the form of multiple spatially separated light components, or in the form of a single broadband beam in which case the light components, after passing through corresponding narrowband imaging modules (e.g. corrected for chromatic aberrations), are combined together by passing them through an appropriate spectral beam combiner.

It should be understood that the term "narrowband" used herein is a relative term signifying a spectral range for which an optical element can be configured to focus/image light of the entire spectral range with no or minimal chromatic aberrations, or for which a corrector can be configured to optimally correct for chromatic aberrations within the entire spectral range.

The invention provides for producing an image with minimal aberrations over a spectral range of wavelengths from deep ultraviolet (wavelength around 100 nm) to the far infrared region (wavelength around 1 mm).

The present invention is particularly useful when light of different wavelength ranges is to be focused on a common focal plane, e.g. is to be imaged on a common region of interest (e.g. light detector). For example, this is typically the case when a common focusing/imaging arrangement (formed by one or more lenses) is used for the light propagating through the system, such as in microscopy for example.

The invention may be used in various applications including those of a type operating with spatially separated input light beams of different relatively narrow wavelength ranges required to be concurrently focused onto a common region of interest and of a type operating with one or more broadband input beams. In the systems of the second type, the input broadband beam is first split into a plurality of narrower-band light components, and then these light components pass through appropriate imaging modules. Thus, the use of a spectral beam splitter is optional.

In case the system utilizes several stages of the broadband light passage through common optical elements (which would introduce chromatic aberrations for the broadband light), these common imaging modules are preferably configured to provide partial correction of chromatic aberrations. For example, the system may utilize passage of light through a first focusing arrangement (e.g. objective lens arrangement), and/or passage of light through an imaging lens associated with a light detector. The imaging modules may be configured to correct for chromatic aberration introduced by both the objective and the imaging lens.

The optical system of the present invention thus includes a combination of spectral imaging modules specific to limited spectral ranges, which together produce an ultra-broad-band system with minimal aberrations. The system may also include imaging modules that are common to the entire spectral range. The spectral range of the total optical system is limited only by the transmission properties of the common modules. The common modules may be entirely reflective, so that the spectral range of the total system is essentially unlimited, or they may be composed of refractive materials with a wide transparency range. The common imaging modules may provide partial aberration correction, while the separate spectral imaging modules may provide further aberration correction, including chromatic correction when the common modules are not entirely reflective.

These is thus provided according to one broad aspect of the invention, a method for use in imaging broadband light, the method comprising: passing a plurality of substantially narrowband light components of said broadband light through an array of spectral imaging modules, each of said imaging modules being configured for imaging light of a respective substantially narrow spectral band with minimal aberrations, thereby producing an image with minimal aberrations over the entire spectral range of said broadband light.

Aberration correction may be applied to the light components while passing through the respective spectral imaging modules. To this end, the spectral imaging module may include at least one of the following optical elements: achromatic lens, apochromatic lens, holographic filter, and diffraction lens.

According to some embodiments of the invention, spectral splitting is applied to the input broadband light to produce the plurality of separated substantially narrowband light components, before passing them through the separate spectral imaging modules.

According to some embodiments of the invention, at least some of light components, passed through the spectral imaging modules, are spectrally combined into a combined broadband light beam.

According to some embodimens of the invention, the input broadband light, formed by the plurality of substantially narrowband light components, is passed through a first common imaging module, and light output therefrom is directed onto the spectral imaging modules. In some embodiments spectral splitting is applied to the broadband light output from the first common imaging module to produce the plurality of narrowband light components to pass through the separate spectral imaging modules. The first common imaging module may be made of a material substantially reflective with respect to the broadband light used in the system; or may be made of a substantially transmitting refractive material. Partial aberration correction may be applied to the broadband light while passing it through the first common imaging module.

In some embodiments, a second common imaging module is used for imaging broadband light formed by spectrally combining the narrowband light components output from the separate spectral imaging modules. Partial aberration correction may be applied to the broadband light while passing it through the second common imaging module.

Preferably, an imaging system is configured to produce a plurality of light components output from the spectral imaging modules propagating along substantially parallel axes. This can be achieved by appropriately configuring the spectral imaging modules and/or spectral beam splitting module.

According to another broad aspect of the invention, there is provided an imaging system for operating with broadband light formed by a plurality of substantially narrowband light components, the system comprising an array of spectral imaging modules, each of said spectral imaging modules being configured for imaging light of a respective substantially narrow spectral band with minimal aberrations, thereby enabling passage of said plurality of substantially narrowband light components through said spectral imaging modules, to produce an image with minimal aberrations over the entire spectral range of said broadband light.

According to yet another broad aspect of the invention, there is provided an imaging system for producing an image formed by broadband light containing a plurality of substantially narrowband light components, the system comprising an array of spectral imaging modules, each of said spectral imaging modules being configured for imaging light of a respective substantially narrow spectral band with minimal aberrations, thereby enabling passage of said plurality of substantially narrowband light components through said spectral imaging modules, to produce on a light detector an image with minimal aberrations over the entire spectral range of said broadband light.

According to yet another broad aspect of this invention, there is provided an imaging system for operating with broadband light formed by a plurality of substantially narrowband light components, the system comprising an objective lens arrangement for focusing the input broadband light; a spectral beam splitting module for splitting the broadband light output from the objective lens arrangement into the plurality of narrowband light components; and an array of spectral imaging modules accommodated for passing therethrough said plurality of light components, respectively, each spectral imaging module being configured for imaging light of the respective substantially narrow spectral band with minimal aberrations, thereby enabling imaging of the plurality of light components of the broadband light onto a common focal plane.

According to yet another broad aspect of the invention, there is provided an imaging system for operating with broadband light formed by a plurality of substantially narrowband light components, the system comprising an array of spectral imaging modules, each of said spectral imaging modules being configured for imaging light of a respective substantially narrow spectral band with minimal aberrations; a spectral beam combiner for combining the plurality of light components output from the spectral imaging modules into a combined output broadband light beam; and a common imaging lens arrangement for imaging said output combined broadband light beam onto a common focal plane, a resulted image thereby having minimal aberrations over the entire spectral range of said broadband light.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 1A schematically illustrates chromatic aberration effects typically caused by a simple lens;

FIGS. 1B and 1C illustrate how the chromatic aberration effect can be reduced by using, respectively, achromatic and apochromatic lenses;

DETAILED DESCRIPTION OF EXEMPLARY EMBODIMENTS

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined to provide a system and method for use in correcting chromatic aberrations in refractive imaging systems over an unlimited range of wavelengths.

FIGS. 1A-1C schematically illustrate chromatic aberration effects typically caused by a simple lens (FIG. 1A), and how these chromatic aberration effect can be reduced by replacing the simple lens by an achromatic lens (FIG. 1B) and apochormatic lens (FIG. 1C). As shown in the figures, achromatic and apochormatic lenses provide for a reduced but not eliminated chromatic fringing.

Figure 2:
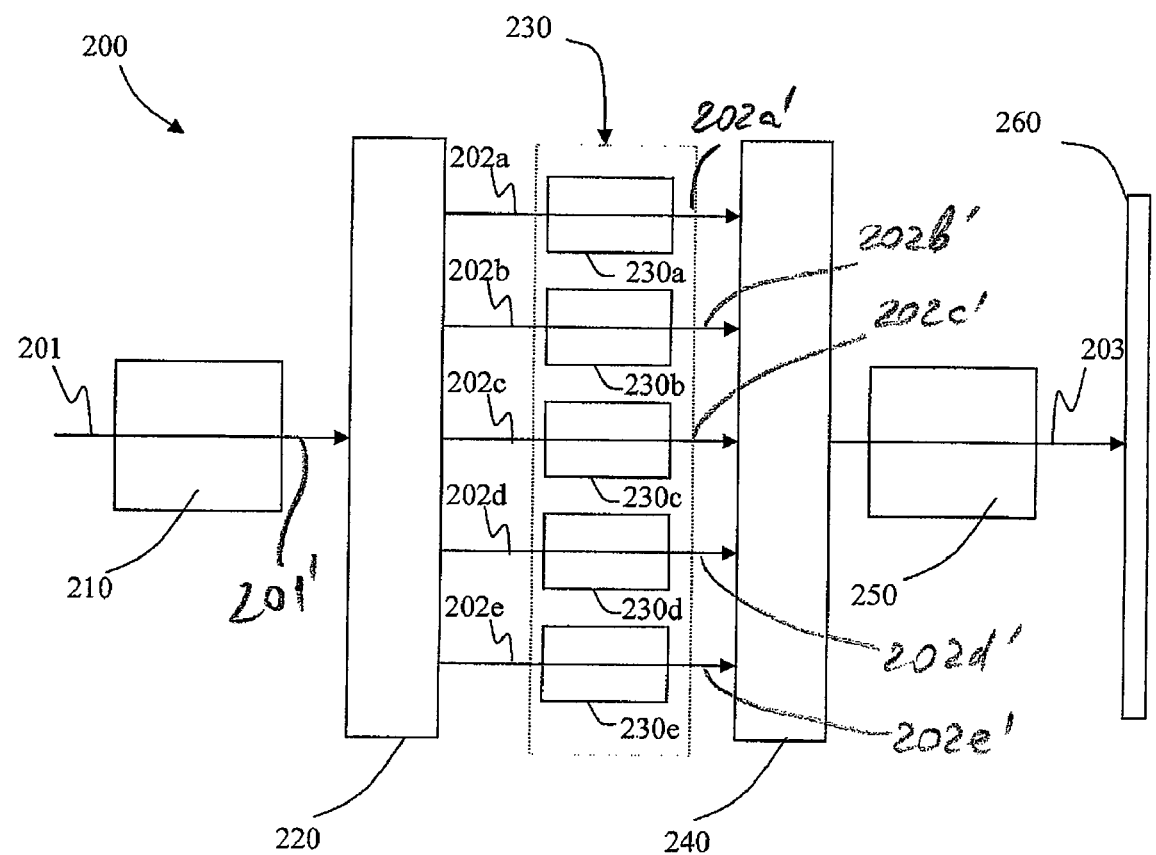
FIG. 2 is a block diagram of an example of an imaging system according to the present invention.

Reference is now made to FIG. 2 illustrating, by way of a block diagram, an example of an imaging system 200, of the present invention. System 200 is configured as a combination of modules, which together produce an ultra-broad-band system with significantly reduced chromatic aberrations. Some of these modules are common to the entire spectral range of input light, while others are specific to limited spectral ranges. The total operating spectral range of the system is limited only by transmission properties of the common modules. The latter may be entirely reflective, so that the total operating spectral range of the system is essentially unlimited, or the common modules may be made of refractive materials with a wide transparency range. The common modules provide only partial aberration correction, while the other modules provide further aberration correction, including chromatic correction when the common modules are not entirely reflective.

In the present example, system 200 is used as a part of a microscope or telescope set up, being associated with a microscope/telescope objective or aperture 210 constituting a first common imaging module that performs an intermediate imaging of input broadband light 201. System 200 includes a spectral beam splitting arrangement (module) 220 accommodated in the optical path of light emerging from common imaging module 210; an array of spectral imaging modules at the output of the beam splitting module, five such imaging modules 230a-230e being shown in the present example. Module 220 is configured for splitting broadband light incident thereon into a plurality of relatively narrowband beams, such a beam splitting module may include wavelength-selective filter(s), for example dichroic filters, or resonators such as ring resonators. Each of spectral imaging modules 230a-230e operates on its own limited (narrowband) spectral range, and includes for example one or more lenses, which may be configured for aberration correction for a respective spectral range.

Also provided in system 200 is a spectral beam-combining module 240 which recombines the separate spectral ranges to produce a single broadband image. Further provided in the system of the present example, is a second common optical module 250 located at the output of beam-combining module 240. Module 250 may be configured as an imaging lens arrangement for imaging (focusing) the broadband image output from the beam combiner onto a broadband detector 260.

System 200 operates as follows: An input broadband light beam 201 of a certain spectral width $\Delta\lambda_T$ (e.g. emanating from a single broadband source, or a combined light beam coming from another optical system) formed by a plurality of i narrowband light components $\Delta\lambda_1$, passes through first common imaging module 210 (such as microscope objective or the aperture of an optical telescope). This imaging module 210 may be configured for partial aberration correction. Light 201' emerging from module 210 is directed onto spectral beam splitting module 220, which splits beam 201' into the plurality of i light components, five such light components 202a-202e being shown in the present example, with lower spectral widths $\Delta\lambda_1$-$\Delta\lambda_5$. These spectral widths may be equal or not. Light components 202a-202e pass through spectral imaging modules 230a-230e, which in the present example are arranged such that each of light components 203a-203e is associated with a corresponding one of imaging modules 230a -230e. So light components 202a is imaged by imaging unit 230a, light component 202b is imaged by imaging unit 230b and so on, resulting in output light components 202a'-202e' of substantially no chromatic aberrations.

In the present example, light components 202a'-202e' are then recombined in a common beam-combining module 240 into a combined broadband output light beam 203, which is directed to a light detector 260 through second common imaging module 250. Imaging module 250 may also be configured for performing partial aberration correction of broadband beam 203. In other words, the spectral imaging module may be configured for correcting chromatic aberrations introduced by either one or both of the first and second common imaging modules 210 and 250.

The total operating spectral range of the imaging system is limited only by the transmission properties of the first and second common modules. The common modules may be entirely reflective, so that the total spectral range of the imaging system is essentially unlimited, or they may be made of refractive materials with a wide transparency range. The common modules provide only partial aberration correction, while the other separate imaging modules provide further aberration correction, including chromatic correction when the common modules are not entirely reflective.

It should be understood that the provision of the first common imaging module, as well as that of the second common imaging module, is optional, depending on the specific application of the invention. Hence, the imaging system of the invention may include solely a spectral beam-slitting module and separate imaging modules each operating with its own limited spectral range.

Figure 3:
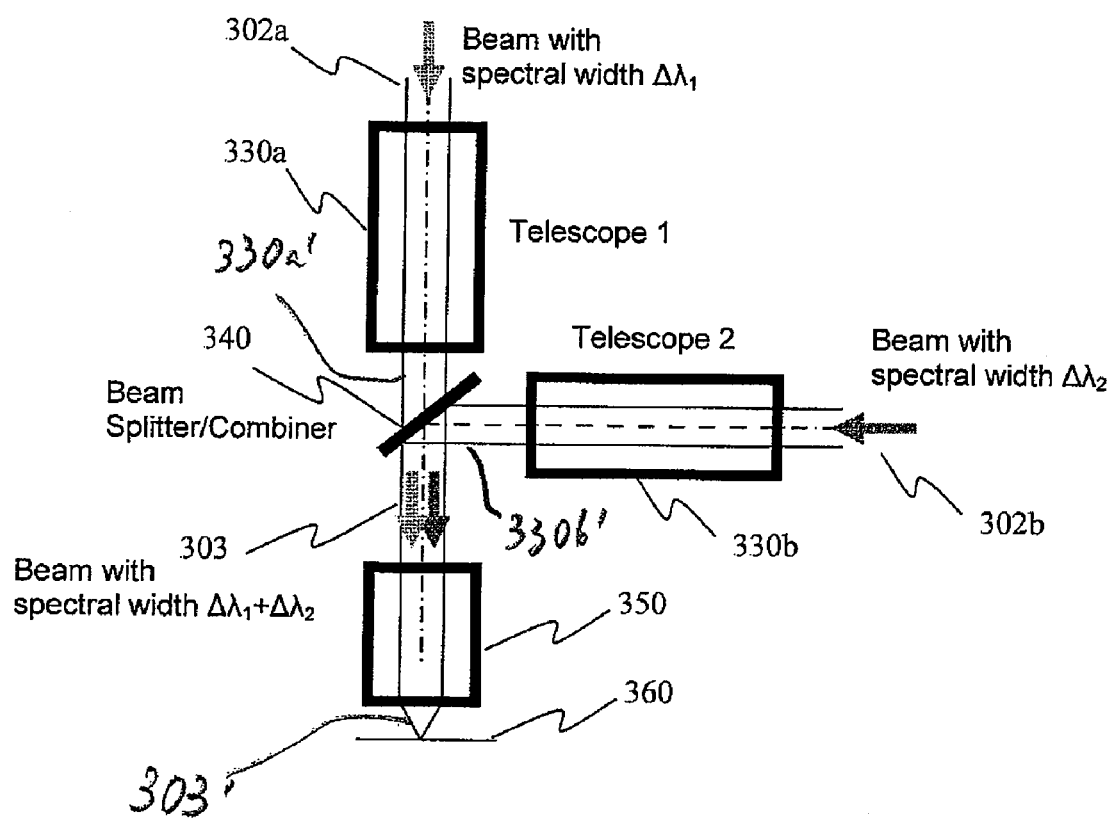
FIG. 3 is a schematic illustration of another example of an imaging system according to the invention.

Reference is now made to FIG. 3, which schematically illustrates another example of an imaging system, generally designated 300, of the present invention. In this example, input light is formed by spatially separated light components, two such light components 302a and 302b being shown in the present example, of different narrow bandwidths $\Delta\lambda_1$ and $\Delta\lambda_2$ respectively. Light components 302a and 302b may be output beams of preceding optical system(s), or may be a result of passage of an input broadband light beam from a common source through a preceding spectral beam splitting arrangement. System 300 includes separate spectral imaging modules (telescopes) 330a and 330b operating with reduced chromatic aberrations for respective spectral ranges $\Delta\lambda_1$ and $\Delta\lambda_2$; a beam-combining module 340; and a common imaging module 350 for imaging light onto a broadband detector 360. Light components 302a and 302b pass through respective telescope modules 330a and 330b and resulting output light components 303a' and 303b', while thus have minimal chromatic aberrations, are imaged onto spectral beam-combining module 340 (e.g. including a dichroic filter), resulting in a combined output broadband beam 303 with a spectral width of ($\Delta\lambda_1$+$\Delta\lambda_2$). This beam 303 is focused by common imaging module 350 onto detector 360.

Figure 4:
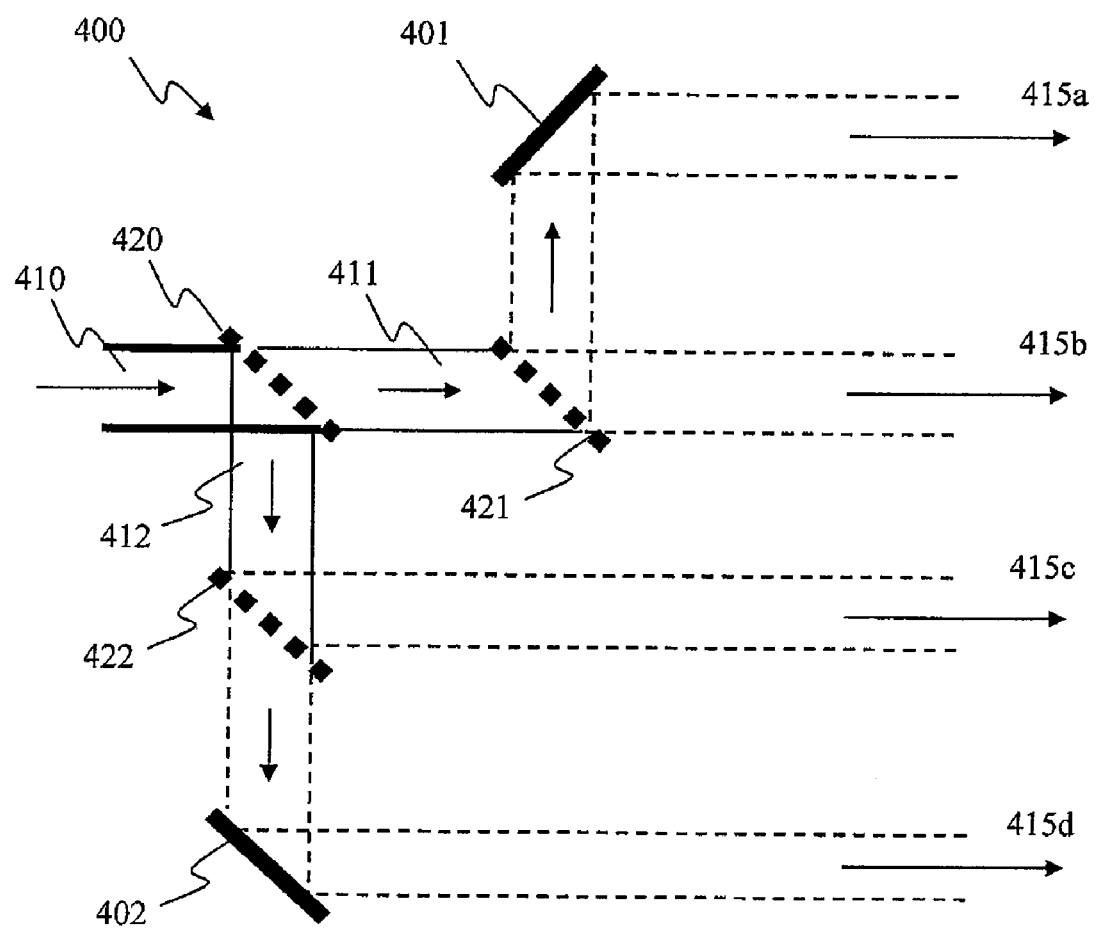
FIG. 4 schematically exemplifies a beam splitter arrangement suitable to be used in the system of the present invention.

Reference is now made to FIG. 4 exemplifying the configuration and operation of a beam splitter arrangement 400 suitable to be used in the system of the present invention. Beams splitting arrangement 400 is configured to split a broadband input beam 410 into an array of output spatially separated substantially parallel light components 415a-415d of narrow wavelength ranges. Broadband beam 410 of electromagetic radiation impinges onto a beam splitting surface 420 configured for example as a dichroic mirror, which is formed of a certain material adapted for transmitting a certain spectral range and reflecting all the others, thus producing two light components 411 and 412 of narrower band widths, which propagate towards further wavelength-selective filters (e.g. dichroic filters or mirrors) 421 and 422, respectively. Light component 411 is split by dichroic filter 421 into two output light components 415a and 415b. A mirror 401 is appropriately accommodated in the optical path of light component 415a to reflect to propagate along an axis substantially parallel to the axis of propagation of light component 415b. Similarly, light component 412 is split by dichroic filter 422 into two output light components 415c and 415d, and the latter is reflected by a mirror 402 to propagate along an axis substantially parallel to the other output light components. All the output light components will then pass through an array of spaced-apart parallel spectral imaging modules as described above. It should be understood that a beam splitting arrangement can be appropriately configured to divide input light into any number of light components of any desired spectral width.

Those skilled in the art will readily appreciate that various modifications and changes can be applied to the embodiments of the invention as hereinbefore exemplified without departing from its scope defined in and by the appended claims.

The invention claimed is:

1. A method for use in imaging broadband light, the method comprising:

passing the broadband light through a first common imaging module configured to apply partial aberration correction to said broadband light, applying spectral splitting to the partially corrected broadband light to split it into a plurality of substantially narrowband light components, passing the plurality of substantially narrowband light components of said partially corrected broadband light through an array of spectral imaging modules, each of said imaging modules being configured for imaging light of a respective substantially narrow spectral band with minimal aberrations, and applying aberration correction to the light components while passing through the respective spectral imaging modules, combining the corrected light components, output from the spectral imaging modules, into a combined output broadband light beam, and passing the combined broadband light beam through a second common imaging module configured to apply to said broadband light partial aberration correction, thereby producing an image with minimal aberrations over the entire spectral range of said broadband light.

2. The method of claim 1, wherein the plurality of substantially narrowband light components are directed along substantially parallel axes.

3. The method for use in imaging broadband light, the method comprising:

passing the broadband light through a first common imaging module, and directing light output from said first common imaging module to an array of spectral imaging modules passing a plurality of substantially narrowband light components of said broadband light through the array of spectral imaging modules, each of said imaging modules being configured for imaging light of a respective substantially narrow spectral band with minimal aberrations, thereby producing an image with minimal aberrations over the entire spectral range of said broadband light.

4. The method of claim 3, comprising applying aberration correction to some of the light components of said broadband light while passing said broadband light through the first common imaging module, light output from the first common imaging module being thereby partially corrected for aberrations.

5. The method of claim 3, wherein a plurality of light components output from the spectral imaging modules, respectively, are directed along substantially parallel axes.

6. A method for use in imaging broadband light, the method comprising:

passing a plurality of substantially narrowband light components of said broadband light through an array of spectral imaging modules, each of said imaging modules being configured for imaging light of a respective substantially narrow spectral band with minimal aberrations, spectrally combining at least some said plurality of narrowband light components, passed through said spectral imaging modules, into a combined broadband light beam, passing the combining broadband light through a second common imaging module, and performing partial aberration correction of the broadband light while passing said light through the second common imaging module, thereby producing an image with minimal aberrations over the entire spectral range of said broadband light.

7. A method of claim 6, wherein the plurality of narrowband light components output from the spectral imaging modules, respectively, are directed along substantially parallel axes.

8. An imaging system for operating with broadband light formed by a plurality of substantially narrowband light components, the system comprising:

an array of spectral imaging modules, each of said spectral imaging modules being configured for imaging light of a respective substantially narrow spectral band with minimal aberrations, thereby enabling passage of said plurality of substantially narrowband light components through said spectral imaging modules, to produce an image with minimal aberrations over the entire spectral range of said broadband light, and a first common imaging module made of a material substantially reflective with respect to said broadband light or made of a substantially transmitting refractive material, the first common imaging module being located in an optical path of the input broadband light upstream of said spectral beam splitting modules, with respect to a direction of light propagation through the system, wherein the first common imaging module comprises an aberration correction unit adapted to perform partial aberration correction of the light components of said broadband light.

9. A system of claim 8, wherein at least some of the spectral imaging modules comprise aberration correction units, each configured for aberration correction for a respective spectral range.

* * * * *